(12) United States Patent
Draper et al.

(10) Patent No.: US 11,333,893 B1
(45) Date of Patent: May 17, 2022

(54) LIGHT COMBINER EMPLOYING A CURVED WAVEGUIDE SYSTEM

(71) Applicant: Arizona Board of Regents on Behalf of the University of Arizona, Tucson, AZ (US)

(72) Inventors: Craig Thomas Draper, Tucson, AZ (US); Pierre Alexandre Blanche, Tucson, AZ (US)

(73) Assignee: Arizona Board of Regents on behalf of The University of Arizona, Tucson, AZ (US)

( * ) Notice: Subject to any disclaimer, the term of this patent is extended or adjusted under 35 U.S.C. 154(b) by 0 days.

(21) Appl. No.: 17/603,523

(22) PCT Filed: May 13, 2020

(86) PCT No.: PCT/US2020/032747
§ 371 (c)(1),
(2) Date: Oct. 13, 2021

(87) PCT Pub. No.: WO2020/232170
PCT Pub. Date: Nov. 19, 2020

Related U.S. Application Data

(60) Provisional application No. 62/847,644, filed on May 14, 2019.

(51) Int. Cl.
*G02B 27/01* (2006.01)
*F21V 8/00* (2006.01)

(52) U.S. Cl.
CPC ....... *G02B 27/0172* (2013.01); *G02B 6/0023* (2013.01); *G02B 2027/0174* (2013.01); *G02B 2027/0178* (2013.01)

(58) Field of Classification Search
CPC .. G02B 27/0172; G02B 27/017; G02B 27/01; G02B 6/0023; G02B 6/0013;
(Continued)

(56) References Cited

U.S. PATENT DOCUMENTS 10,416,452 B2 * 9/2019 Cheng ................ G02B 27/0172
10,509,241 B1 * 12/2019 Robbins ............. G02B 27/0149
(Continued)

FOREIGN PATENT DOCUMENTS

WO 2018031634 A1 2/2018

OTHER PUBLICATIONS

PCT International Search Report and Written Opinion, PCT/US2020/032747, dated Aug. 19, 2020, 12 pages.

*Primary Examiner* — William R Alexander
(74) *Attorney, Agent, or Firm* — Quarles & Brady LLP; Yakov S. Sidorin

(57) ABSTRACT

A light-combining optical imager includes a spatially-curved waveguide-body complemented with at least two and preferably at least three holographic layers disposed on the surface(s) of the waveguide-body to couple light into the waveguide-body, optionally redirect its propagation inside the waveguide-body, and outcouple light from the waveguide body to form an optical image with reduced aberrations and—when desired—while expanding the pupil size of the imager upon propagation of light through the waveguide-body to achieve a one-to-one optical conjugation between an object and an image. At least one of the holographic layers includes potions having different diffraction efficiencies. At least one of the holographic layers is optionally configured to operate as a non-zero optical power lens element. Spatial separations between the holographic layers judiciously relate to dimensions of the portions of the holographic layers to achieve the desired result.

15 Claims, 9 Drawing Sheets

(58) Field of Classification Search
CPC .......... G02B 6/0011; G02B 2027/0174; G02B 2027/0178
See application file for complete search history.

(56) References Cited

U.S. PATENT DOCUMENTS

| | | | |
|---|---|---|---|
| 11,175,512 B2* | 11/2021 | Waldern | G02B 26/105 |
| 2014/0376207 A1* | 12/2014 | Futterer | G02B 6/0035 |
| | | | 359/3 |
| 2018/0188542 A1 | 7/2018 | Waldern et al. | |
| 2018/0275402 A1 | 9/2018 | Popovich et al. | |
| 2019/0227316 A1* | 7/2019 | Lee | G02B 5/1857 |
| 2019/0278086 A1* | 9/2019 | Ofir | G02B 6/122 |
| 2019/0285899 A1* | 9/2019 | Levola | G02B 27/0018 |
| 2019/0293853 A1* | 9/2019 | Ayres | G02B 5/1819 |
| 2019/0317261 A1* | 10/2019 | Dimov | G02B 27/0172 |
| 2019/0369403 A1* | 12/2019 | Leister | G02B 27/0172 |

* cited by examiner

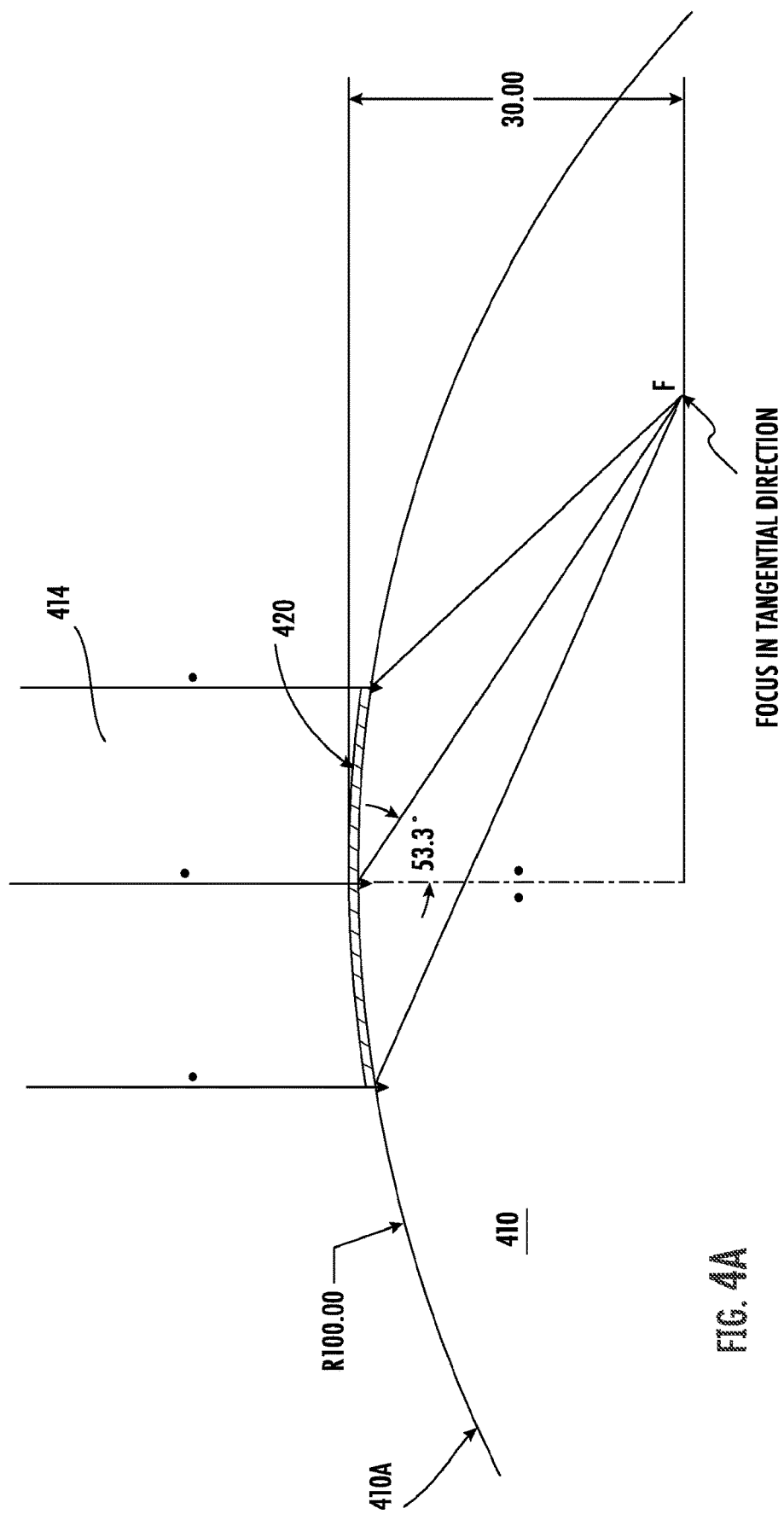

LIGHT COMBINER EMPLOYING A CURVED WAVEGUIDE SYSTEM

CROSS-REFERENCE TO RELATED APPLICATIONS

This patent application represents the US national stage entry from the International Application No. PCT/US2020/032747, filed on 19 May 2020, which claims priority from the U.S. Provisional Patent Application No. 62/847,644 filed on May 14, 2019. The disclosure of each of the above-identified patent documents is incorporated by reference herein.

TECHNICAL FIELD

The present invention relates generally to optical waveguide-based combiners and, in particular, to spatially-curved light combiners configured for use in augmented reality applications and head-up displays.

RELATED ART

Waveguide head-up displays (HUDs) and near-to-the-eye displays (that is, displays configured to be employed in the vicinity or rights in front of the eye of the user) have recently been developed to utilize flat optical waveguides—that is, the waveguides that are defined by or dimensioned as substantially planar optically-transparent substrates or plates. (See, for example, digilens.com). Such flat-waveguide-based combiners (illustrated in FIGS. 1A, 1B, 1C, and 1D as components 110 incorporated into the visor of the helmet for augmented reality (AR) applications; 120 as part of the avionic HUD; and 130, 140 as components of the near-to-the-eye displays) limit, in practice, both the integration capabilities and the aesthetic appeal of the overall systems. Indeed, considering that a visor or a lens (with which the flat-waveguide-based combiner is operably cooperated) is spatially curved, the juxtaposition of the combiner of the related art with such visor or lens results is a contraption the thickness of which exceeds the thickness and/or geometrical boundaries of the visor or lens itself, but which also requires a non-trivial methodology of fabrication and/or component integration.

The use of curved-waveguide systems would allow for better inset of the resulting light combiners in various vehicles (facilitating, for example, a geometrical conformation of the waveguide combiners with car windshields or aircraft canopy) and would improve the aesthetics for augmented reality near-to-the-eye displays. With curved waveguides, the augmented reality (AR) systems can be made to look like modern sunglasses and/or a visor of a helmet, instead of looking like a flat bulky appendage (see FIGS. 2A, 2B).

SUMMARY

Embodiments of the invention provide an optical waveguide system that includes a waveguide (WG) of optically-transparent material (with upper and lower surfaces at least one of which is curved in at least one dimension) and a first holographic layer disposed at a first location in contact with a first surface from the upper and lower surfaces. Here, the first holographic layer is configured to couple a first light beam, incident thereon, into the WG to form a coupled optical wavefront and cause said coupled optical wavefront to propagate along a first extent of the WG from the first location to a second location. This optical waveguide system is configured such that extent of a foot-print (defined by an intersection of the coupled optical wavefront with any of the upper and lower surfaces) remains substantially constant in at least one dimension upon propagation of the coupled optical wavefront along a first extent of the WG.

The system may be configured to ensure the use of the first light beam that has a spatially-diverging optical wavefront. In at least one implementation, the system may additionally include a second holographic layer at a second location in contact with a WG surface. Such second holographic layer is configured to extract the coupled optical wavefront, incident thereon, from the WG to form a spatially-converging second light beam. (Notably, depending on the specifics of the implementation of the system, the first surface and the WG surface may be chosen to be the same surface of the WG.) Alternatively or in addition—and in substantially every implementation—at least one of the upper and lower surfaces may be curved in a first dimension and in a second dimension (the first and second dimensions being defined by first and second axes, respectively, that are transverse to one another) and/or the system may include a third holographic layer disposed at a third location in contact with a chosen surface of the WG. When the third holographic layer is present, this layer is configured a) to receive the coupled optical wavefront that has propagated in the WG from the first holographic layer, and b) to redirect said coupled optical wavefront along a second extent of the WG (in this latter case, the third location is separated from the first location by a first separation distance that is substantially equal to an integer multiple of the extent of the foot-print. Alternatively or in addition, the second holographic layer may include several portions such that a first portion of the second holographic layer is characterized by a first diffraction efficiency and a second portion of the second holographic layer is characterized by a second diffraction efficiency. Here, the first and second diffraction efficiencies are configured to be different from each other to expand the extent of the foot-print in a first direction. Alternatively or in addition, the third holographic layer may also include several portions (a first portion of the third holographic layer is characterized by a third diffraction efficiency; a second portion of the second holographic layer is characterized by a fourth diffraction efficiency; and the third and fourth diffraction efficiencies are different from each other to cause expansion of the extent of the foot-print in a second direction). In substantially any implementation, at least one holographic layer juxtaposed with the WG may be configured to change a degree of spatial divergence (convergence, collimation) of light incident thereon.

Embodiments of the invention additionally provide a method for forming an image in light emanating from a source of light. Such method includes a step of propagating first light, incident onto a first holographic layer attached to a surface of an optical waveguide (WG) at a first location of the WG, inside the WG to a second location (here, first light propagating inside the WG has an optical wavefront), as well as a step of extracting light from the WG at the second location to form outcoupled light to generate the image at an image plane. The WG has upper and lower surfaces, at least one of the upper and lower surfaces being curved in at least one dimension; and a combination of the first holographic layer and the WG is configured such that extent of foot-print in the at least one dimension remains substantially constant upon propagation of the first light inside the WG along a first axis (here, the foot-print is defined by an intersection of the optical wavefront with any of the upper and lower surfaces).

In at least one embodiment, the step of extracting includes extracting light at the second location with the use of a second holographic layer disposed therein in contact with the WG (here, the second location is separated from the first location by a first separation distance that is substantially equal to an integer multiple of the extent of the foot-print) and/or additionally including a step of redirecting the first light propagating inside the WG along the first axis to propagate inside the WG along a second axis, the first and second axes being transverse to one another. In such specific case, the first axis represents a first extent of the WG and the second axis represents a second extent of the WG. The step of redirecting may include redirecting the first light upon interaction of the first light with a third holographic layer juxtaposed with a surface of the WG at a third location.

Alternatively or in addition, and in substantially every implementation of the method, the step of propagating may include propagating the light inside the WG with the at least one of the upper and lower surfaces being curved both in a first dimension and in a second dimension (which dimensions are defined by a third axis and a fourth axis, respectively, that are transverse to one another)

BRIEF DESCRIPTION OF THE DRAWINGS

The invention will be more fully understood by referring to the following Detailed Description of Specific Embodiments in conjunction with the Drawings, of which:

FIG. 1A: a combiner for a near-to-the-eye display AR system; FIG. 1B: a combiner for avionic HUD; FIG. 1C: Microsoft Hololens near-to-the-eye display; FIG. 1D: The Vuzix Blade. Note the combiners inside the "dome" formed by the visor and/or proximate to a lens of a particular device being formed in a flat substrate and not a curved substrate.

FIG. 4A illustrates a curved waveguide with an insertion (injection) hologram on the upper surface thereof.

Generally, the sizes and relative scales of elements in Drawings may be set to be different from actual ones to appropriately facilitate simplicity, clarity, and understanding of the Drawings.

For the same reason, not all elements present in one Drawing may necessarily be shown in another.

DETAILED DESCRIPTION

A skilled artisan will readily appreciate that—as compared to other technologies—the advantage of using a pane of a waveguide or, more generally, a lightpipe (as known in related art) as a light combiner for HUD or AR systems is that once the light from the object is injected or coupled into the waveguide and guided or channeled in it, such guided light can be extracted multiple times, while increasing (or possibly decreasing) the pupil size of the system. Larger pupil size offers an extended eye-box so the image can be seen from a larger volume, ultimately improving the comfort for the viewer.

The image of the object can be then formed with or in light (that has been outcoupled or extracted from the waveguide) with the use of various different type of elements employed for this purpose in related art—such as prisms, reflectors, or diffraction gratings, for example.

All the waveguide-based combiner systems discussed so far—whether commercial or scientific—have utilized a waveguide element defined by a substantially planar substrate dimensioned to channel the light.

Figure 1A:
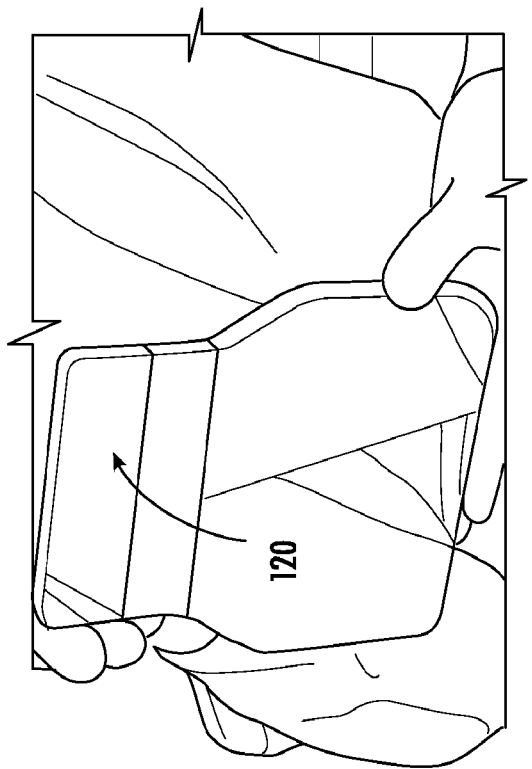
FIGS. 1A, 1B, 1C, 1D illustrate the use of flat-waveguide-based combiners of related art.
Figure 1D:
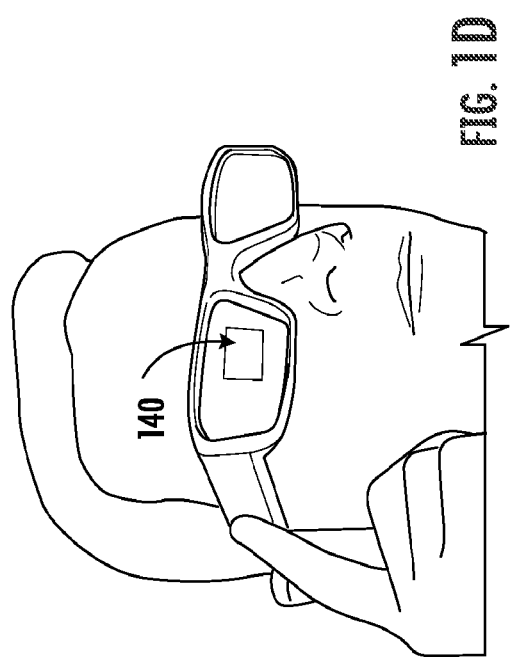
Figure 1B:
Figure 1C:
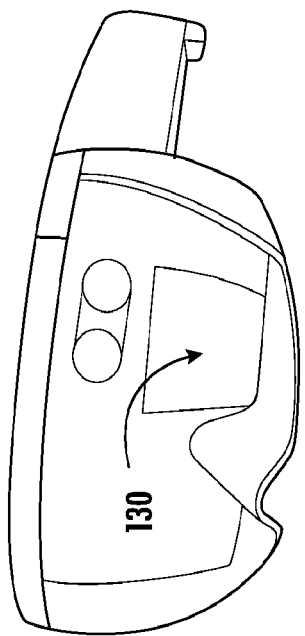
Figure 2A:
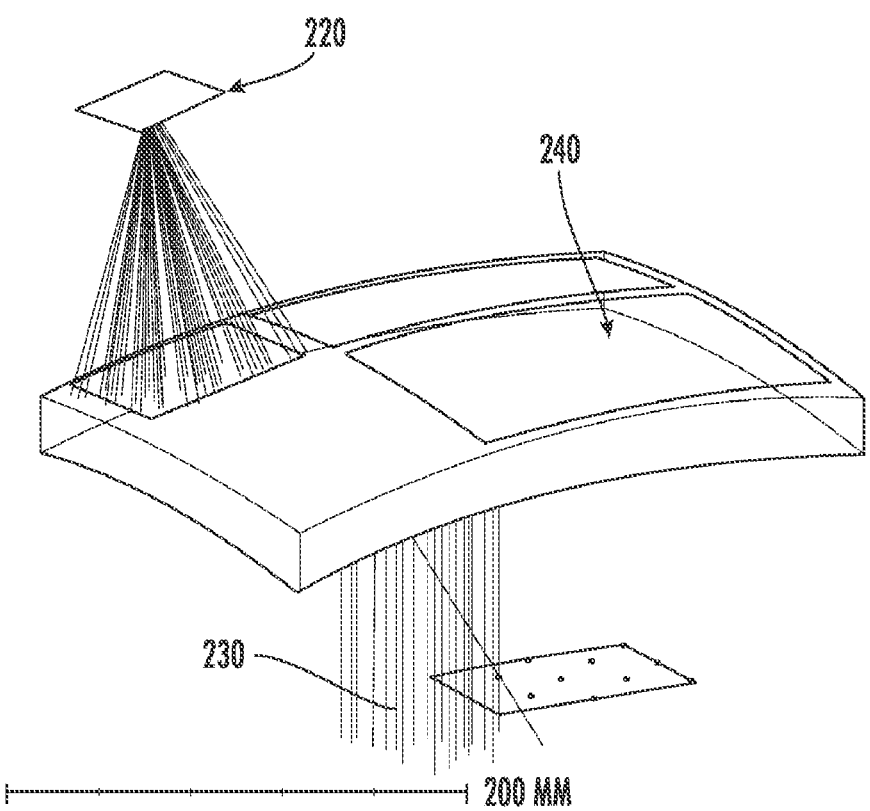
FIG. 2A: Illustration of a ray tracing model of a curved-waveguide-based combiner where no aberration-compensation was applied.

While intuitively it may be tempting to use the curved-waveguide-based systems, which could improve not only the aesthetics for augmented reality near-to-the-eye displays (making these look like modern sunglasses and/or a visor of a helmet, instead of looking like a flat bulky appendage), but could also allow for better inset of the resulting light combiners in various vehicles (facilitating, for example, a geometrical conformation of the waveguide combiners with car windshields or aircraft canopy), the persisting practical difficulty that prevented the related art from successfully implementing the use of a spatially-curved curved waveguide stems from the fact that the spatial distribution of light (propagating inside the waveguide component and later forming the image) is distorted by the spatially-curve nature (curvature) of the waveguide component. If no appropriate action is taken to counteract such inevitable distortion, the image that is formed in the outcoupled from the waveguide-component light is substantially spatially aberrated (as compared to light distribution across the original object being imaged). In reference to the schematics of FIGS. 2A and 2B, for example, the image 210 of the object 220, formed in light 230 that is outcoupled from the combiner structured around the curved-waveguide 240, is formed on a substantially unpredictably spatially-curved surface, deviates from being linear, and is doubled at least in part (that is, it lacks the one-to-one point-to-point mapping correspondence between the image and the object).

Moreover, although spatially curved combiners, such as holographic combiners, have already been demonstrated in related art, such curved combiners are not utilizing the waveguide (light channeling or guiding inside the lightpipe) effect, and do not allow for increase of the size of the pupil.

Embodiments of the present invention address these problems and provide an unexpected way to use a spatially-curved waveguide element for formation of an optical image while compensating for the spatial aberrations of light distribution so the extracted image is substantially free from spatial distortion(s). As will become clear to the skilled artisan from the following disclosure, the proposed system(s) is configured to implement (work with) multiple extractions of light so the pupil expansion advantage of the proposed waveguide-based imaging approach is preserved.

Accordingly, embodiments of the present invention solve a problem of inability of the light combiners of related art (that are configured for use in head-up display- and/or augmented-reality-based applications and that are structured around a curved waveguide defined by a chosen spatially-curved or bent substrate) to form a substantially spatially-undistorted image with light extracted from such combiners while, at the same time, maintaining the freedom of either maintaining the ratio of the size of the image to the size of the object being imaged to be substantially unity, or changing such ratio as desired.

In particular, embodiments of the invention resolve this problem by configuring a light combiner device with the use of a waveguide that is formed in and defined by an optical plate that is curved in at least one spatial dimension or direction, and that is complemented with at least one hologram structured as an optical diffractive device in physical contact with a surface of the waveguide. Variation of a size of the image (as compared to the size of the object being imaged) is achieved by utilizing at least one hologram having sub-sections that have corresponding diffraction-efficiency characteristics that are different from the diffraction-efficiency characteristics of the neighboring sub-sections of the hologram.

For the purposes of present disclosure, and unless expressly stated otherwise, the terms "light" and "optical" are used in their most general meanings as referring to an electromagnetic wave having a wavelength within the visible region of the optical spectrum and, optionally, within a region that neighbors the visible region (a flanking region) such as UV and or near IR.

The meaning and/or definition of the term "hologram" is that commonly accepted in the field of physics and optical sciences; this term as used herein generally refers to and implies a diffraction pattern—produced by a spatially-split coherent beam of radiation (such as a laser beam) in a layer of optical material, or computed/calculated and then tangibly transferred to the layer of optical material.

The term "holographic layer" or a similar term refers to and/or defines a layer or stratum of material containing a hologram recorded therein (in a body or thickness of the layer) and/or as a surface modulation (surface relief) of such layer. One example is provided by a layer of an appropriately-chosen photosensitive material (such as, for example, photopolymer, dichromated gelatin, photo thermorefractive glass, photoresine) the distribution of index of refraction and/or thickness of which is modified such that the layer diffracts the light incident on such a layer, is understood to be a holographic layer.

Figure 3C:
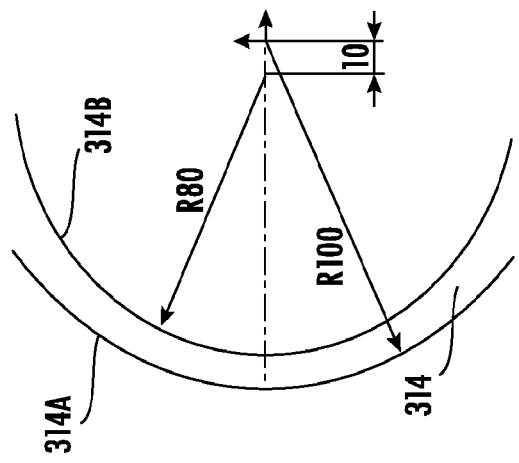
FIGS. 3A, 3B, 3C schematically illustrate different waveguide-body geometries.
Figure 3B:
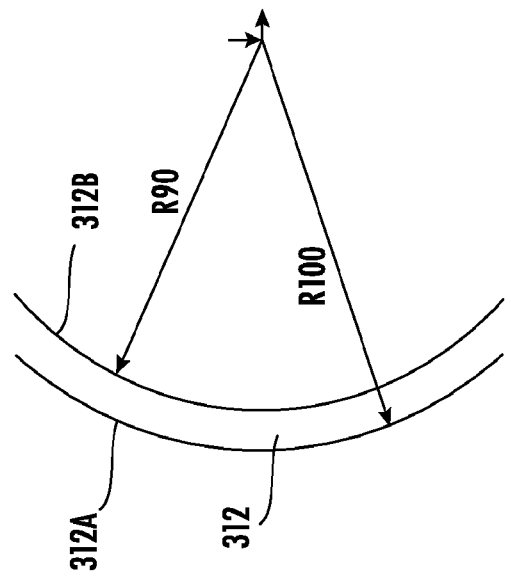
Figure 3A:
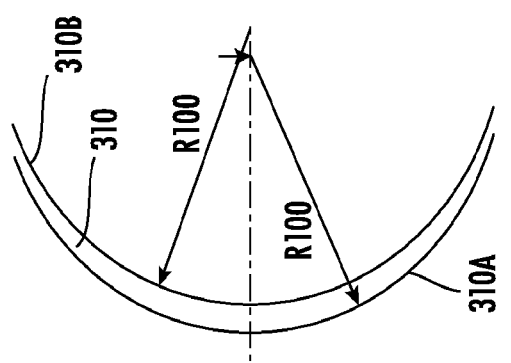

According to the idea of the invention—and as is shown in schematic diagrams of FIGS. 3A, 3B, 3C—an optical plate defining a waveguide component can be dimensioned as either (i) a radius-matched curved plate (FIG. 3A), where the radius of the upper or incident surface 310A (on which light is incident from the object operation of an embodiment of the invention) is substantially equal to the radius of the lower surface 310B (that is opposite to the upper surface 310A). Here, the centers of curvature of the upper and lower surfaces of the waveguide optical curved component 310 are spatially distinct from one another and displaced with respect to one another along an axis perpendicular to at least one of the upper and lower surfaces 310A, 310B;

or (ii) as a waveguide component 312 that has substantially-concentric upper and lower surfaces 312A, 312B (FIG. 3B); or, (iii) in reference to FIG. 3C, as a waveguide component 314 that exhibits the optical power (for light L incident onto the upper or incident surface 314A) that is substantially zero. In this embodiment of the waveguide component, the center of curvature of the upper surface 314A is located further away from the component 314 than the center of curvature of the lower surface 314B along an axis that is perpendicular to at least one of the upper and lower surfaces (which is opposite to the situation observed in the embodiment of FIG. 3A). In FIGS. 3A, 3B, 3C: R1 denotes the radius o curvature of the upper (outer) surface of the waveguide body, and R1 denotes the radius of curvature of the inner (lower) surface of the waveguide body; t represents the thickness of the waveguide body of FIG. 3B In one implementation, a spatially-curved-waveguide-based light-combiner system was designed with the use of Zemax® software such that the front (upper, incident) and back (lower) surfaces of this waveguide component have are either substantially concentric with one another or configured according to the situation depicted in FIG. 3C. This choice was explained by the need to avoid the substantial lensing effect on the light incident onto the upper surface of the waveguide component.

Furthermore, according to the idea o the invention an embodiment of the overall waveguide-based system includes a so-called injection hologram (interchangeably referred to herein as an insertion hologram, or as an incident hologram), juxtaposed with the upper (front, incident) surface of a given waveguide component. The injection hologram is configured to couple the light, incident upon it from an object, into and inside the waveguide component itself such as to have this light propagate inside the body of the waveguide component while satisfying the total-internal-reflection (TIR) conditions. (In doing so, the channeled inside the WG component light directs or relays an image of the object toward the next hologram that is disposed in contact with a surface of the waveguide body at some distance from the injection hologram, as will be discussed below.)

For example, in one implementation the injection hologram is either configured to couple light incident onto the upper surface into the light-guiding channel of the waveguide or juxtaposed with a lower surface of the waveguide component (in which case such injection hologram is configured to couple that light into the waveguide that interacted with the upper surface and then traversed the body of the waveguide towards the lower surface. To this end, FIG. 4A schematically illustrates the upper surface 410A (with the radius of curvature indicated to be, in this example, 100 mm) of the waveguide component 410 of the system of the invention and light 414 (shown in this example as a substantially collimated beam) incident upon the injection hologram 420 cooperated with the upper surface 410A. (The lower surface of the waveguide component 410 is not shown for simplicity of illustration). The hologram 420 is structured—in absence of the bottom surface of the WG component 410—to converge the incident beam 414 into a focal distribution of light that in the plane of FIG. 4A (tangential plane) is perceived as focus F. In this example, the ray of the beam 414 incident onto the hologram 420 substantially along the axis of the beam 414 is refracted towards the focus F at about 53.5 degrees and the focus F is located at about 30 mm below the hologram 420.

Figure 4B:
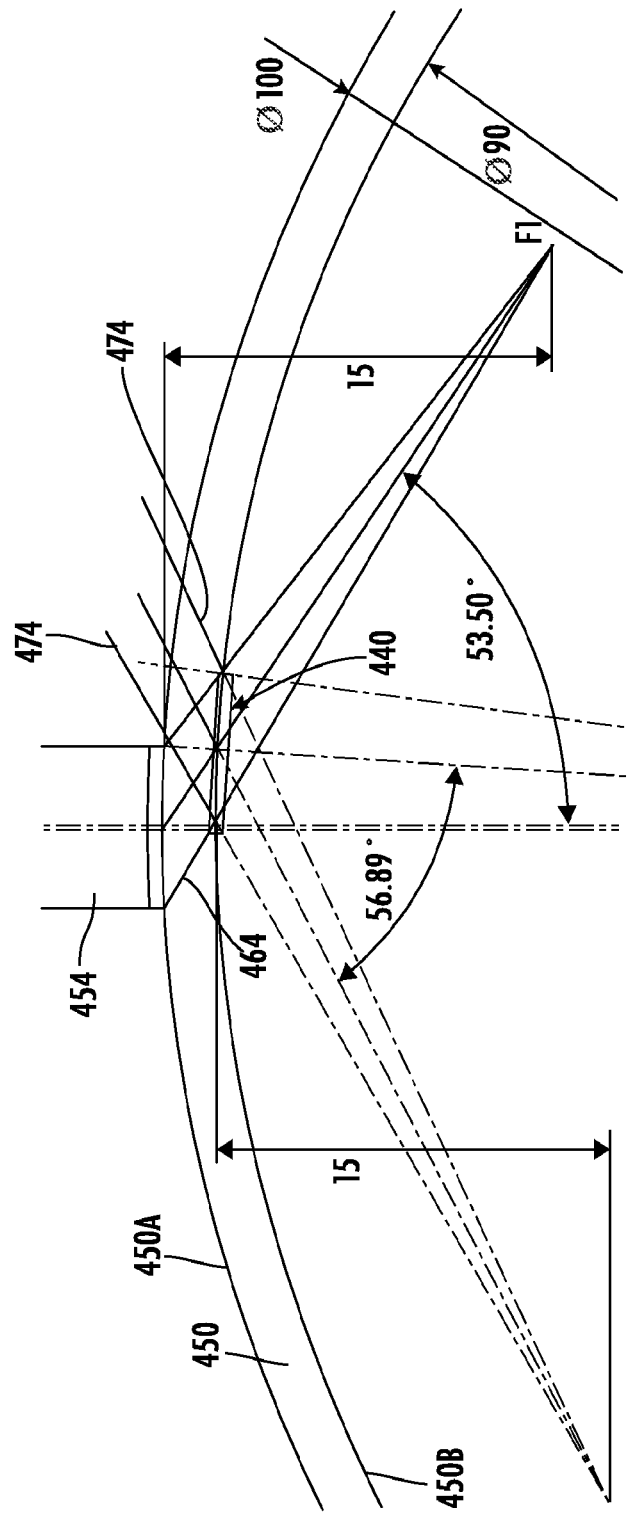
FIG. 4B illustrates a curved waveguide with an insertion (injection) hologram on the lower surface thereof.

FIG. 4B schematically illustrates a related situation, where the injection hologram is disposed on the lower surface 450B of the body of a chosen waveguide component 450 (in this example structured according to the embodiment 312 of FIG. 3B). As shown here, the incident onto the upper surface 450A substantially-collimated beam of light 454 is refracted through the surface 450A to from the beam 464 that propagates towards the lower surface 450B. In absence of the incident hologram 440 and the bottom surface 450B of the WG component 450, at least a portion of light at hand would be substantially converged towards the focus F1 (shown in the tangential plane of FIG. 4B). The hologram 440, however, is designed such as to diffract the internally incident onto it light from the beam 454 and return it in a general direction towards the upper surface 450A in a form of the beam 474 while, at the same time, spatially restructuring the beam 474 as compared with the beam 464. Specifically, the insertion hologram 440 is appropriately structured (considering at least one or more the specific dimensions of the WG body 450—such as the thickness of about 4 mm, as indicated—as well as the material of choice for fabrication of the WG 450 and the wavelength of light at hand) to change the converging beam 464 to the diverging beam 474 that appears to emanate from the point source O disposed as indicated in this example. Accordingly, the foot-print (the geometric expanse or extent) of the beam 464 on the hologram 464 is shown to be changed to a larger foot-print of the beam 474 on the surface 450A.

Figure 5:
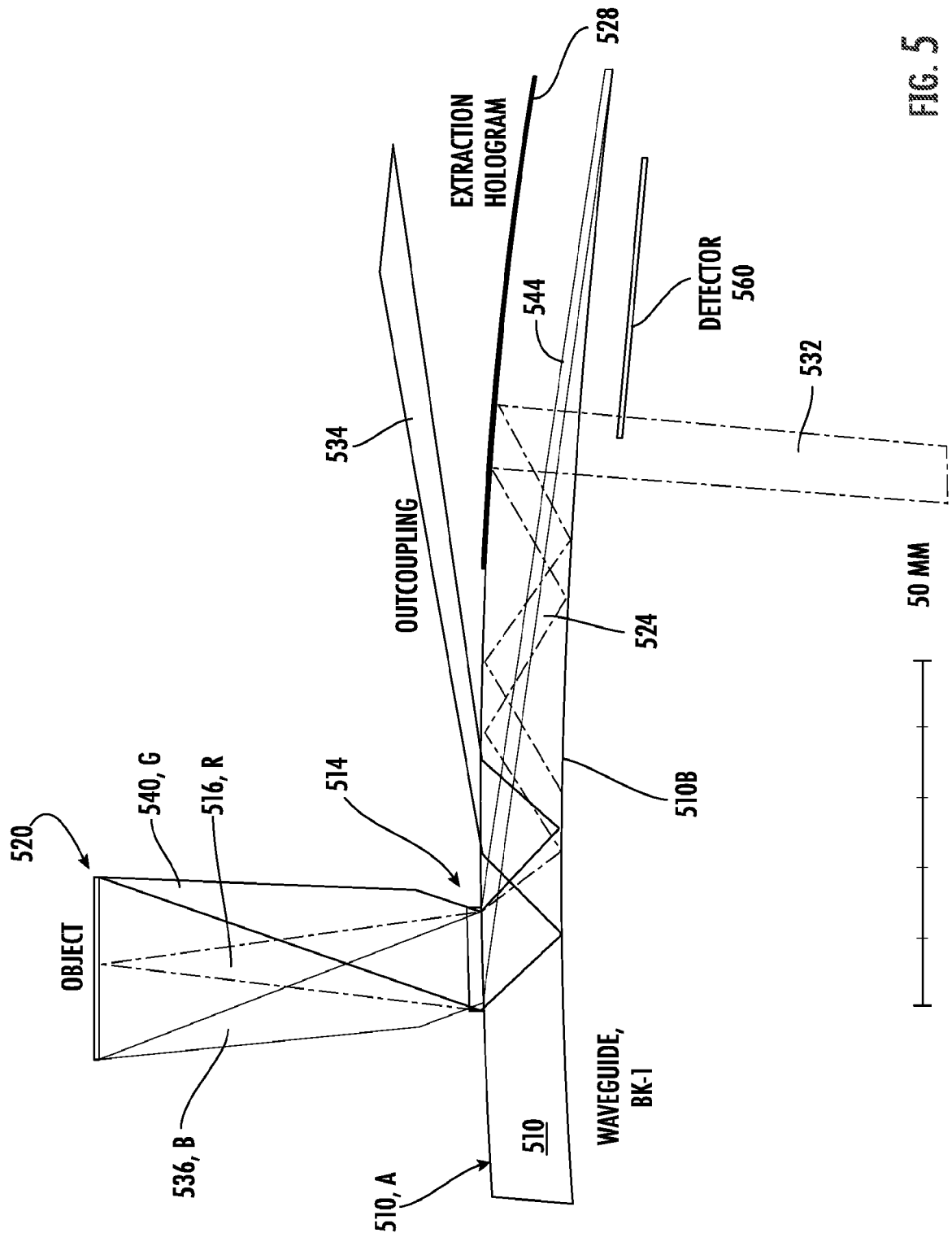
FIG. 5 depicts the spatial cooperation of the injection and extraction holograms of an embodiment of the invention.

An embodiment of the overall system may additionally include a so-called extraction hologram, the purpose of which is to outcouple light (that has been already channeled by the waveguide body from the injection hologram) towards the optical detector or a visual system of the observer. FIG. 5 provides a schematic illustration to this concept, by showing the waveguide component 510 operably cooperated with the injection hologram 514 (on the upper surface 510A of the component 510 shown to be made from BK-7 glass material), which couples light carried by the beam 516 emanating from a given point of the object 520 into the waveguide 510 to form guided light 524); and an extraction hologram 528 (in this case shown to be in contact also with and disposed along the upper surface 510A). The extraction hologram (schematically illustrated with the line 528) is judiciously structured to contain holographic diffractive element that outcouples the guided light 518 through the body 510 and the lower surface 510B (once the guided light reaches and interacts with the hologram 528) to form the outcoupled (output) beam 532. Understandably, depending on the details of pa particular implementation, the injection and extractions holograms can be chosen to be disposed at the same surface of the WG body (whether the upper surface or the lower surface) or at WG surfaces that differ from one another. Notably, for the purposes of comparison, beams 536, 540 of light at wavelengths that are different from the wavelength of the beam 516 are also shown emanating from respectively-corresponding points of the same object: unlike the beam 516 (indicated to have spectral content in a red portion of the visible portion of the optical spectrum, as indicated by the label R), the spectral content of the beam 536 is that corresponding to the blue portion of the visible spectrum (label B) while the spectral content of the beam 540 is that corresponding to the green (label G) portion of the visible spectrum. As a person of skill in the art will readily appreciate, for the chosen design parameters of the WG 510 the same insertion hologram 514 transforms the beam 540 into the beam that is channeled along the WG 510 only for a short distance, and is then outcoupled from the WG 510 as light 534 once the TIR condition for the channeled light has been frustrated. At the same time, the beam 536 in the blue portion of the spectrum is coupled into the WG body 510 at a very steep angle, and is shown to propagate in the WG 510 as beam 544 beyond the hologram 528. The position of the optical detector 560 (or a visual system) is schematically indicated across the useful beam 532 outcoupled by the extraction hologram 528.

Figure 6A:
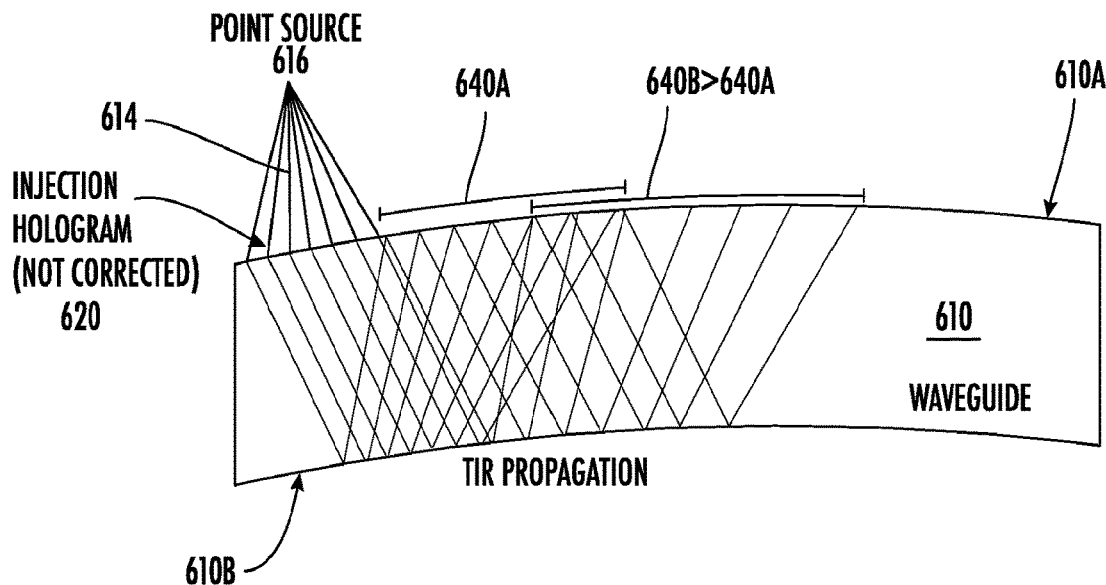
FIGS. 6A and 6B: Cross-sectional illustration of the ray propagation inside the curved waveguide without (FIG. 6A) and with (FIG. 6B) compensation provided by the judicious design of the injection hologram.

Generally, as a skilled artisan will readily appreciate, when traveling (being channeled) inside the curved waveguide, the channeled light distribution (in the case illustrated in FIG. 5—that of the beam 524) follow cycles of spatial focusing and expansion due to the optical power provided by the curvature of the waveguide surface(s). As a result of such cycling, the size of the "effective aperture" or "pupil size" or simply foot-print that the propagating insider the WG channel beam of light is generally not conserved, and the rays from different cycles of reflections of the beam can overlap each other. In the diagram of FIG. 6A, this situation is schematically illustrated as follows:

the spatially-diverging beam of light 614 that emanates from a point source 616, is incident onto the insertion hologram 620 at the upper surface 610A of the spatially-curved WG 610.

the hologram 620 diffracts the incident beam 614 into the waveguide 610 through the surface 610A to form the coupled beam 630 channeled now (under the TIR conditions) along the waveguide 610.

as shown, upon the first reflection by the lower surface 610B, the beam 630 forms the foot-print 640A on the upper surface 610A of the waveguide body and, due to the continued spatial expansion of the beam 630, the foot-print 640B formed by the beam 630 on the upper surface 610A after another cycle of reflections is not only larger than that of print 640A but also now partially overlaps with the foot-print 640A.

Figure 6B:
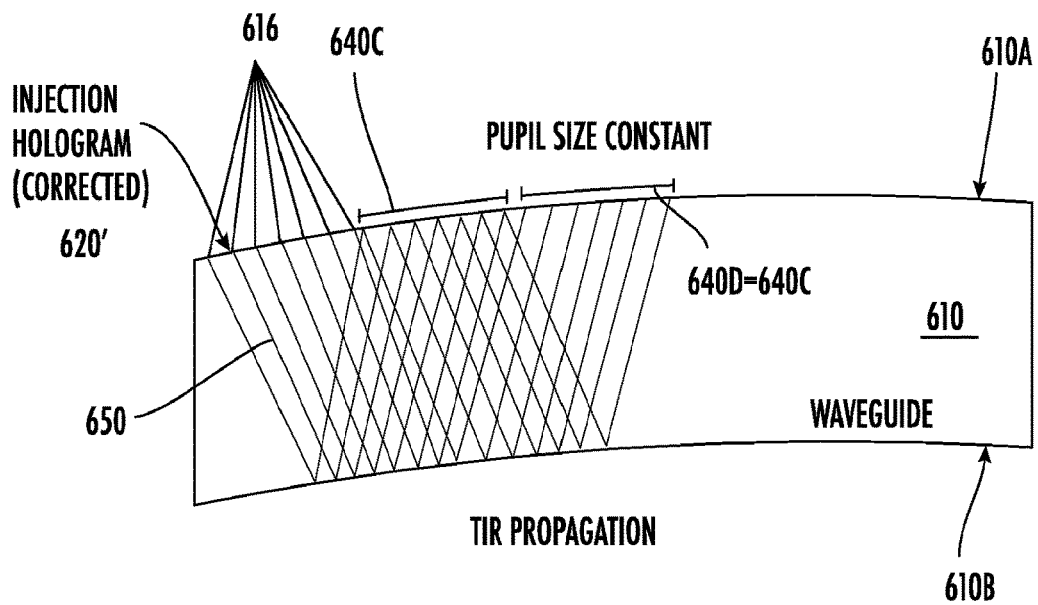

Such overlap causes a clear operations deficiency, specifically, when the channeled light has to be outcoupled from the WG 610 with the use of an appropriate extraction hologram, either such extraction hologram has to be disposed only to directly correspond to the portion of the appropriate foot-print of the beam that does not overlap with the neighboring foot-print of the same beam (in which case not all light in the beam will be interacting with the extraction hologram), or the extracted (outcoupled) light will contain the portions of the beam corresponding to different cycles of reflection within the WG 610 (in which case, the image later formed with the outcoupled light will be inherently aberrated). To correct for these operational shortcoming, and according to the idea of the invention, a first aberration-correction scheme may be utilized in at least one embodiment. Specifically, the insertion hologram is judiciously configured to possess a non-zero optical power itself, in order to add or complement the process of insertion (coupling) of light into the WG with the focusing effect, for the rays of coupled and now channeled light to not modify the pupil size (the footprint of light coupled into the WG at the injection hologram) upon the propagation within the waveguide and in order for the rays produced by different total internal reflections of the channeled light at the waveguide surfaces to remain spatially separated. Understandably, when a given holographic layer is structured to possess a non-zero optical power, such holographic layer changes a degree of spatial divergence (or, more generally, spatial spreading—which includes also a degree of convergence and collimation) of the optical front incident upon it. The operation of the so-corrected hologram (now labelled 620' in FIG. 6B) produces the substantially-co-extensive pupil sizes or foot-prints or effective beam apertures 640C, 640D every time the coupled-into-the WG 610 distribution of light 650 interacts with one of the upper and lower WG surfaces 610A, 610B.

A person of skill in the art will appreciate, therefore, that an embodiment of the invention provides an optical waveguide-based light combiner system that includes at least a waveguide of optically-transparent material having upper and lower surfaces (here, at least one of the upper and lower surfaces is curved in at least one dimension or, stated differently, along at least one axis); and a first holographic layer disposed at a first location in contact with a first surface from the upper and lower surfaces. Here, the first holographic layer is configured to couple a first light beam, incident thereon, into the WG to form a coupled optical wavefront and cause such coupled optical wavefront to propagate along a first extent of the WG from the first location to a another, second location. The optical waveguide-based system is configured such that extent of an area (that is referred to as a "pupil size") in the at least one dimension remains substantially constant upon propagation of the coupled optical wavefront along the first extent of the WG. Such area (interchangeably referred to as a pupil size or a foot-print of light coupled into the WG with the use of the first holographic layer) is defined by an intersection of the coupled optical wavefront with any and/or both of the upper and lower WG surfaces. In a related implementation, the waveguide is complemented with another, second holographic layer juxtaposed against (and in contact with) one of the upper and lower WG surfaces at a second location. (Here, the second holographic layer is configured to extract the coupled optical wavefront, incident thereon, from the WG by diffracting light to form a spatially-converging second light beam).

Depending on specific application of the overall system, the body of the waveguide-based combiner may be additionally and optionally equipped with yet another hologram (holographic layer), referred to as a redirection hologram and discussed below. (In such specific case the optical waveguide-based system of the invention includes first, second, and third spatially-individual holograms.) The operational purpose of the redirection hologram is to receive light channeled in the WG (which light has propagated towards the redirection hologram from the hologram preceding it as viewed along the direction of light channeling), and to redirect such light toward the next, following hologram disposed at the waveguide. The so-configured operation of the waveguide-based system may be used to cause and result in an expansion of the pupil size in two dimensions—that is, as measured at a foot-print of the channeled light formed at one of the waveguide surfaces in a plane tangential to that foot-print. Alternatively, the redirection hologram may be configured in such a fashion as to maintain the pupil size in the second dimension substantially constant—by analogy with the configuration discussed in reference to FIG. 2B.

Figure 7:
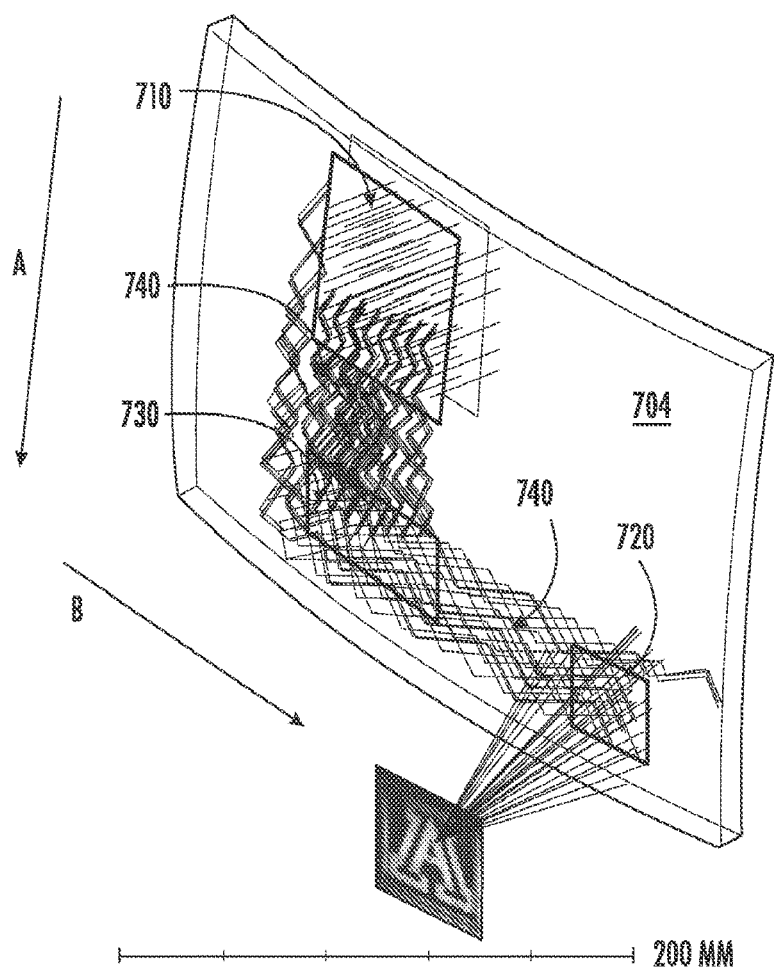
FIG. 7 illustrates the operation of a redirection hologram disposed according to an embodiment of the invention.

Furthermore, according to the idea of the invention the redirection hologram may be configured not only to relay the coupled light towards the next hologram (while optionally facilitating the increase of the pupil size in a second dimension) but also change an initial direction of propagation of the coupled light inside the waveguide. This scenario is schematically shown in FIG. 7. Here, the injection hologram on the front surface of the spatially-curved waveguide component 704 of thickness t is denoted as 710, the extraction hologram (in this case, also disposed on the front surface of the waveguide 704 facing the viewer)—as 720, and the redirection hologram is denoted as 730. The propagation of light coupled into the WG at the injection hologram 710 is shown to be changed upon interaction of the channeled light (indicated with multiple ray-traces 740) with the redirection hologram 730, to which the channeled by the waveguide 704 light that has arrived from the hologram 710: the change of propagation occurs in this example from that along axis A to propagation along axis B (and towards the extraction hologram 720).

When the WG is equipped with only three holograms (one of which is an injection hologram and another is an extraction hologram), then the redirection hologram as a third holographic layer is disposed understandably at a third location that is different from the locations of either of the injection and extraction holograms, and in contact with a surface of the waveguide. In this scenario, the third holographic layer is configured a) to receive the coupled optical wavefront that has propagated from the first holographic layer, and b) to redirect said coupled optical wavefront along a second extent of the WG.

EXAMPLE

In one specific implementation, at least one of the extraction and redirection holograms may be configured to include multiple sections (sub-areas). The redirection hologram may be configured to include multiple sections (sub-areas) that are configured to have different distributions of diffractive efficiencies in order to obtain an image (upon outcoupling of light from the waveguide by the extraction hologram) with substantially uniform irradiance distribution and/or to spatially-change the size of the initial pupil (that is, to change the foot-print defined by optical wavefront propagating in the waveguide at a surface of the waveguide) in one dimension. Additionally or in the alternative, the extraction hologram may also include several sections of spatially varying diffractive efficiency to vary (for example—increase) the optical uniformity of the final image and/or to vary the pupil size in the second dimension.

Figure 8:
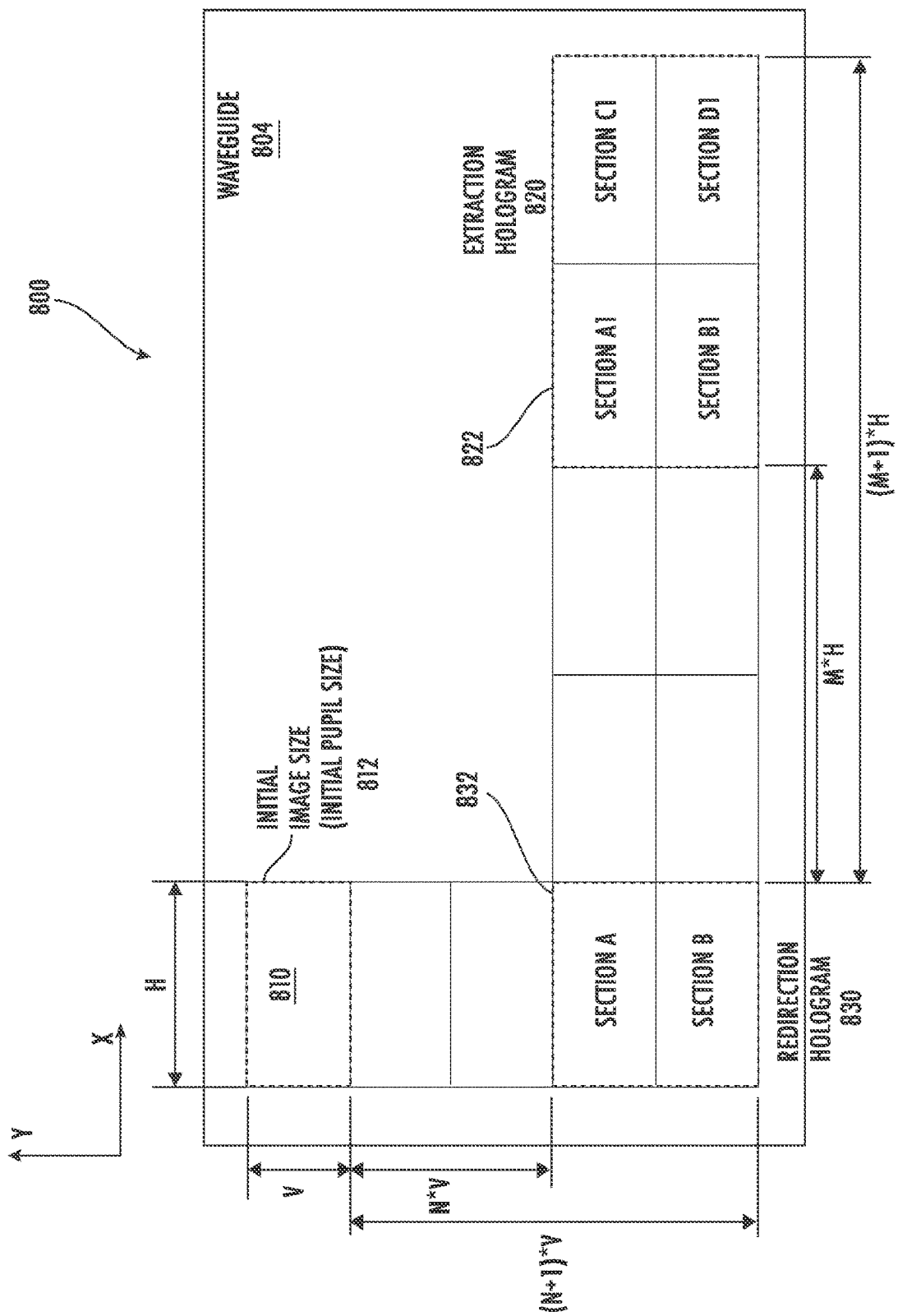
FIG. 8 is a schematic illustration of an embodiment of the invention in front view, illustrating a geometrical condition of mutual positioning of the constituent holograms that, when met (together with additional aberration-correction conditions discussed below), manifests in a substantially aberration-free imaging.

In one example schematically illustrated in FIG. 8 in reference to the local xyz-coordinate system, an embodiment of the optical waveguide contraption of the invention is schematically shown in front view (with the upper surface facing the viewer). The embodiment includes the waveguide 804 spatially-curved in two dimensions (about both x-axis and y-axis, or, alternatively, about a point on the z-axis of the local system of coordinates) such that each of the upper and lower surfaces of the waveguide 804 conforms to a surface of a sphere. Such waveguide 804, referred to herein as a spherically-curved waveguide, is cooperated with the injection hologram 810, the redirection hologram 830, and the extraction hologram 820. (As a skilled artisan will readily appreciate, the exact geometrical boundaries of these holograms may not be of practical use as it is the areas within which light interacts with these holograms that are of importance and, accordingly, only the general approximate locations of the holograms are marked in FIG. 8.)

The initial size of the pupil—that is, the foot-print of light that has arrived at the injection hologram 810 from some outside source of light (for example, a point source)—is illustrated with the dashed line 812. The insertion hologram 810 is configured to couple light at a pre-determined wavelength into the waveguide 804 and direct it towards the redirection hologram 830, which in operation receives the channeled light internally incident upon it and changes the direction of propagation of this light inside the waveguide 804 from the initial direction along the -y axis to the direction of propagation along the x-axis, toward the extraction hologram 820. The diffractive element of the injection hologram 810 is structured to add some optical compensation—non-zero optical power—to the operation of the hologram 810 such as to achieve the effect of maintaining the pupil size to be substantially constant upon the propagation of the channeled light from the hologram 810 to the hologram 830 (as was discussed in reference to FIG. 6B)

The pupil expansion along the y-axis from the initial pupil size corresponding to the foot-print 812 to that denoted with the dashed line 832 at the redirection hologram is accomplished by structuring the redirection hologram 830 to have several sections (in this example shown as A, B) each one redirecting only a portion of the light traveling inside the waveguide. The redirection hologram 830 does not necessarily require to have or introduce any additional optical compensation (as a person of skill will appreciate, the appropriate compensation has been already applied at the point on injection of light into the WG). The embodiment of FIG. 8 illustrates, therefore, a situation in which an area of the second holographic layer (the one corresponding to the redirection hologram 830) includes several sub-areas or portions; where a first sub-area of the second holographic layer is characterized by a first diffraction efficiency with which light, incident the said first sub-area of the second holographic layer, is diffracted by the second holographic layer. Here, a second sub-area of the second holographic layer is characterized by a second diffraction efficiency with which light, incident onto said second sub-area of the second holographic layer, is diffracted by the second holographic layer. Additionally, the first and second diffraction efficiencies of these two sub-areas of the hologram 830 are different from each other. Notably, the redirection hologram 830 can be judiciously configured to ensure that the spatial change of diffraction efficiency across the hologram occurs substantially continuously (instead of being spatially-discrete). This configuration remains within the scope of the invention.

The extraction hologram 820 of the embodiment also includes several sections (shown as A1, B1, C1, and D1) of generally varying diffractive efficiencies that, upon interaction with light that has arrived from the redirection hologram 830, expands the pupil size further and in the second dimension (e.g. along the x-axis) to that outlined with the dashed line 822. The embodiment of FIG. 8 illustrates, therefore, a situation in which an area of the third holographic layer (that one corresponding to the extraction hologram 820) also includes several sub-areas or portions; In this specific example 800, a first sub-area of the third holographic layer is characterized by a third diffraction efficiency with which light, incident onto such first sub-area of the third holographic layer, is diffracted by the second holographic layer; a second sub-area of the second holographic layer is characterized by a fourth diffraction efficiency with which light, incident onto the second sub-area of the third holographic layer, is diffracted by the third holographic layer; a third sub-area of the third holographic layer is characterized by a fifth diffraction efficiency with which light, incident onto the third sub-area of the third holographic layer, is diffracted by the third holographic layer; and a fourth sub-area of the third holographic layer is characterized by a sixth diffraction efficiency with which light, incident onto the fourth sub-area of the third holographic layer, is diffracted by the third holographic layer. Additionally, at least some of the third, fourth, fifth, and sixth diffraction efficiencies are different from each other. The above description addresses only one specific situation.

Generally, however, the extraction hologram 820 can be judiciously configured to ensure that the spatial change or variation of diffraction efficiency across the hologram occurs substantially continuously (instead of being spatially-discrete). This general configuration remains within the scope of the invention.

As a skilled artisan will readily appreciate, due to the spatial curvature of the waveguide 804, the light propagating through the waveguide arrives at different sections of the extraction hologram 820 at respectively-corresponding but different from one another angles. To compensate for such difference in angular direction of propagation, yet another aberration-correction scheme may be employed, according to which the geometry of the different sections A1, B1, C1, and D1 of the extraction hologram 820 is adjusted individually. These adjustment are made such that different beams of light arriving from the same location of the object (same pixel) remain substantially parallel when extracted by the different sections of the hologram 820. The parallelism of the beams ensures that the final image is substantially free form aberration(s).

An additional condition that may be required for this aberration-correction scheme to be workable is that each of the sections of each of the redirection and extraction holograms 830, 820 is preferably placed at a distance of separation, from the previous hologram (injection or redirection respectively), that is an integer multiple of the lateral size of the initial pupil (as illustrated in FIG. 8 with dimensions V, H, and integers M and N). This geometrical condition is imposed, in practice, by the fact that each TIR-based bounce of the coupled optical wavefront within the waveguide 804 changes the reference angle of the constituent rays with respect to these holograms 830, 820.

Figure 2B:
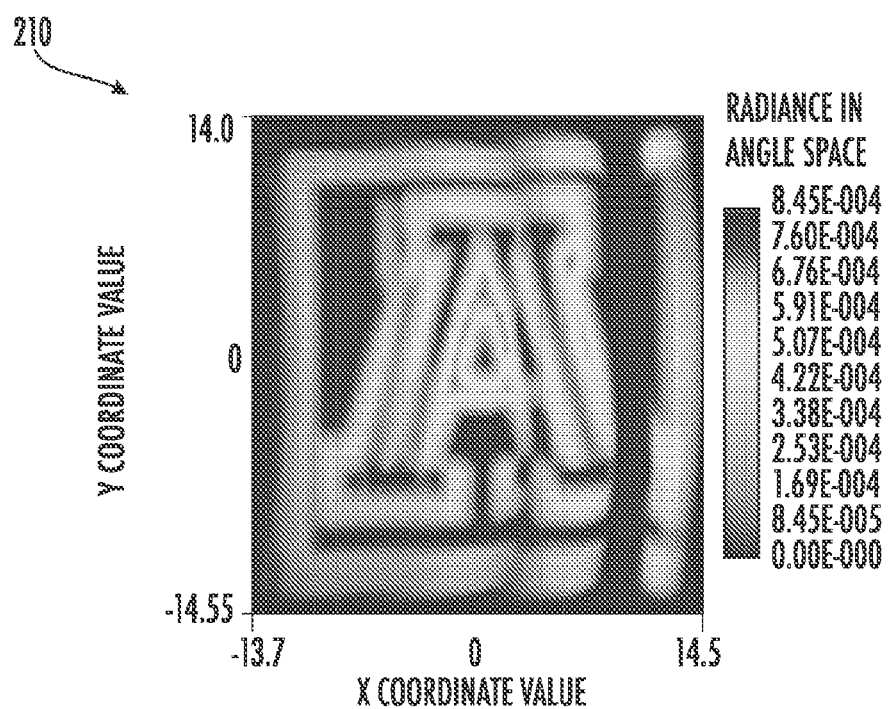
FIG. 2B: the image (extracted from the waveguide-based system that has not be subjected to aberration-compensation, according to embodiments of the invention) has strong aberrations such as curvature and doubling of the image.
Figure 9:
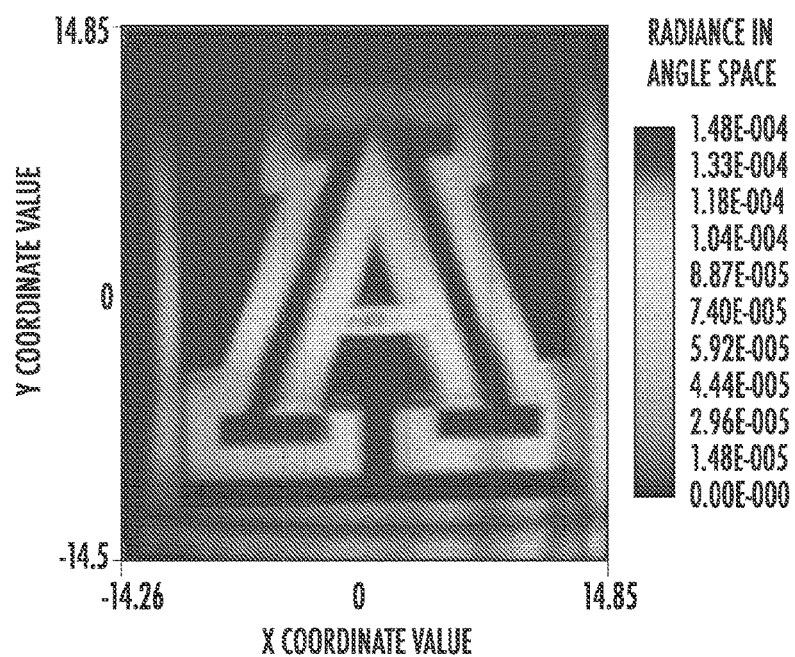
FIG. 9 shows an image produced by an embodiment that has been subjected to aberration-compensation schemes.

Once the aberration-compensation schemes are implemented in the embodiment of the invention, the resulting empirically-acquired image 910 possesses a visibly-higher quality shown in FIG. 9 (compare it to the image 210 of FIG. 2B, for example, obtained with the use of an identical waveguide-based system in which the injection, redirection, and extraction holograms were not configured according to the aberration-compensation schemes discussed above).

Some practical guidelines for design of a specific embodiment of the system discussed in this disclosure, which will be appreciated and understood by a skilled artisan, are provided below in no particular order:

A curved waveguide was designed in Zemax® used in a non-sequential mode due to the repeated interactions with elements in the design.

For design of holographic layers wavelengths of light at hand are pre-determined with the use of, for example, coupled wave analysis to identify characteristics of light that would diffract (as Zemax® does not provide such operability). The wavelength corresponding to the peak diffraction can then be used in the model along with the primary wavelength. Notably, edge lit holograms can be used to couple and extract light with polychromatic selectivity.

The first objects placed in the model were rectangularly-shaped, which was used for reference. These were used as a reference for each object to be placed on the waveguide. The spatial tip and tilt of these rectangles was used to turn the Cartesian coordinate system into spherical coordinate system.

The waveguide shape and dimensions were chosen to allow for propagation of light while inducing minimal amounts of optical power and aberration. The paraxial additive power equation was used to calculate power induced by the waveguide, $$\varphi_t = \varphi_1 + \varphi_2 - \frac{\varphi_1 \varphi_2 t}{n} \text{ where } \varphi = \frac{n' - n}{R}.$$

Setting $\varphi_t = 0$, $n = -n'$ for a reflection system and solving for $R_2$ (the bottom radius) we obtained $R_2 = R_1 - 2t$ where $R_1$ is the top radius. This equation shows that for substantially zero WG-induced power the radius must be different. Notably, the index of refraction of the WG material is not a factor in this calculus. A zero-power waveguide satisfies the paraxial additive power equation, but the varying thickness of the WG induces aberration. A radius-matched waveguide where $R_2 = R_1$ satisfies the paraxial additive power equation if there is no thickness to the waveguide. This also varies the thickness of the waveguide when measuring from the normal to its surface. A waveguide bound by two substantially concentric surfaces induces some optical power but preserves thickness when measured from the normal. The equation for concentric radii of such surfaces is $R_2 = R_1 - t$ and this is close to the zero-power condition, so it was used for the waveguide design. The propagation angle of 53.5° was chosen because such angle yielded a centered field-of view (FOV) with substantially uniformly distributed intensity. At this angle, there are equal angles of light coupling to propagate the image. The limits of the FOV are provided by the process of outcoupling due to TIR conditions being not satisfied (frustrated) and light being channeled too steeply with respect to the WG surface and missing the extraction holograms.

For design in Zemax: One specific embodiment of the waveguide was modelled as a biconic Zernike lens because of the individual radius of curvature control. The sides of the waveguide should preferably have differing radii. The top radius (the radius of curvature of the front surface of the WG) was be chosen as the primary radius with matching x- and y-curvatures on which all holograms are placed. The bottom radius (the radius of curvature of the bottom or rear surface of the waveguide) was chosen to be equal to the top radius less the thickness of the waveguide. When the curved surfaces of the WG were chosen to be concentric, the configuration limited the WG-induced power between the front and rear surfaces. This waveguide should be placed at a distance equal to the radius of curvature from the referenced rectangle in the z direction. The thickness of the WG is determined by the size of the insertion hologram in the relationship $$t = \frac{d}{2\tan 53.5°}$$

where d is the diameter of the insertion hologram.

The first hologram can be considered to be the insertion hologram, which in operation couples light into the waveguide at an angle beyond that of the TIR. The desired parameters stem from the notion that a combination of focusing and diverging beam must be propagating the waveguide to preserve image size by TIR induced by the waveguide surfaces. In one specific example, the tangential focus was formed at a distance of about f=0.3 r and the sagittal focus was formed at about f=r, where r was the radius of the waveguide. (At tighter waveguide curvatures the sagittal focus fits more with f=1.7 r and increases more towards f=2.4 r due to astigmatism induced upon light propagation between each occurrence of the TIR within the WG.) The tangential focus of about f=0.3 r can be explained by the nature of astigmatism when light reflects off a curved mirror at a steep angle. At the propagation angle of 53.3°, the astigmatism reduces the focal length of the mirror by 0.3 in the tangential direction. To obtain a 1:1 optically-conjugate conditions, the object should be at a distance of about 2f away from a reflector. For example, the focal length of a reflector with radiaus of r=100 mm is 50 mm. At 53.5°, this condition dictates that the distance is 15 mm. To obtain a 1:1 optically-conjugate image, the object therefore must be placed at 2 f, which is about 30 mm. (30 mm is 0.3 of the value of radius r=100 mm of the waveguide.) Each surface of the waveguide reflects the light at a 1:1 conjugate to preserve image size. There should be no astigmatism in the sagittal direction but Zemax shows that at tight curvatures every TIR induces sagittal astigmatism. The increase in length compensates for this where the tighter the curvature and more bounces the light reflects causes more astigmatism in the image. F=r satisfies the 1:1 conjugate requirement where the focusing beam equal to the radius places a virtual object at 2 r, which the focal length of the mirror in the sagittal direction is. This produces an image at 2 r as well.

In Zemax: A hologram layer with optical lens quality (that is, possessing and introducing a non-zero optical power) was placed on the waveguide surface at a distance equal to the radius of curvature plus the thickness of the hologram lens from the reference rectangle. Such "hologram lens" feature has individual control of radius of curvature and should preferably have a matching radius as the waveguide surface. The index of the hologram is preferably chosen to match that of the waveguide. The creation wavelength was defined a function of primary wavelength divided by the index of the material of the waveguide. The diffraction order should was set to 1. The coordinates used for creation were (−1.35e8, 0, −1e8) and (0, 0, −1e8) where Zemax uses (x,y,z). This set the hologram to accept a collimated beam incident at a substantially zero angle of incidence and diffract this beam at about 53.5°. Depending on the radius of curvature of the waveguide, the diffracted beam is focused at different lengths. The focusing effect increases with angle due to astigmatism in the tangential and sagittal planes. Alternatively, the insertion hologram with non-zero optical power can also be placed on the bottom surface of the waveguide while its dimension is adjusted accordingly and radius of curvature to match the bottom surface. The creation coordinates would be $$\left(\frac{-nr}{2}\tan 53.5°, 0, \frac{-nr}{2}\right) \text{ and } \left(0, 0, \frac{-r*n}{n-1}\right).$$

These coordinates compensate for the power caused by the first surface (top curved surface of waveguide) the light interacts with and the diffracted angle to produce a beam with appropriate focal points to produce a diffracted beam which resembles the reflected beam in the case where the light enters the waveguide through the insertion hologram.

A paraxial lens may be added directly in front of the non-zero optical power hologram to optionally add power to the hologram to achieve the desired parameters. To achieve the focus points with the combination of insertion hologram lens and the so-added paraxial lens, a separate Zemax file was used and paraxial lens focal distances changed until the parameters were meant. These values were then fed back into the original model. This was done because the tangential and sagittal focus varies with radius of curvature, index, and diffracted angle.

In Zemax: To observe the light path, a point source was used at a distance from the insertion hologram using the same reference rectangle as the insertion hologram. This point source is then collimated by a paraxial lens to meet the insertion hologram creation point parameters. A Lambertian user-defined surface was used to illuminate the object and placed near the same height as the point source. This was used to reduce ray trace calculations done by Zemax instead of using a source rectangle.

The extraction hologram that included at least two areal sections or portions was used to generate the pupil (foot-print) expansion. The pupil was further expanded by varying the diffraction efficiency (DE) of the out-coupling hologram. This recirculates the light within the waveguide to be extracted multiple times.

In Zemax: To simulate varying DE, each extraction hologram section needed to have a biconic Zernike lens as an intermediate partial reflective surface directly beneath it. The reflectivity was a function of 1/q, where q is the integer number of pupil expansions. For example, to achieve a 5× pupil expansion the reflectivities on each biconic Zernike lens was ⅕, ¼, ⅓, ½, and 1. The biconic Zernike lens should be referencing a rectangle and be radius of the waveguide plus thickness of the biconic lens in the z direction. Using the reference rectangle, change the tip and tilt until the biconic lens was an integer amount of insertion hologram size away from the insertion hologram. This was so the entirety of the optical detector (or an eye of the user at the output of the embodiment) received light. If the model included 2 sections, the first section had 50% reflectivity. This can be done by altering the coating of the surface which is in contact with the waveguide.

When using an insertion hologram on the bottom side of the waveguide and extraction holograms on the top, the placement of the holograms was adjusted so that there was a 0.5+k spacing between the insertion hologram and the redirection holograms, where k was an integer.

The use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

A reference to "substantially equal" spectra defines first and second optical spectra the frequency content of which is the same, while the amplitudes of radiation at the same frequency may optionally differ from one another (as in the case when, for example, the second spectrum represents an attenuated version of the first spectrum). Other specific examples of the meaning of the terms "substantially", "about", and/or "approximately" as applied to different practical situations may have been provided elsewhere in this disclosure.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including features disclosed in prior art to which reference is made.

Disclosed aspects, or portions of these aspects, may be combined in ways not listed above. Accordingly, the invention should not be viewed as being limited to the disclosed embodiment(s).

LIST OF REFERENCE NUMERALS

110—flat WG-based light combiner incorporated into the visor of a helmet for augmented reality applications;
120—flat WG-based light combiner as part of the avionic HUD;
130, 140—flat WG-based light combiner as component(s) of the near-to-the-eye display;
210—image of the object 220;
220—object;
230—light outcoupled from the WG-based light combiner;
240—spatially-curved WG;
310—curved WG component;
310A, 310B—upper and lower surfaces of the component 310;
312—curved WG component;
312A, 312B—upper and lower surfaces of the component 312;
314—curved WG component;
314A, 314B—upper and lower surfaces of the component 314;
410—curved WG component;
410A—upper surface of the component 410;
414—light incident onto the component 414;
420—(incident, injection, insertion) hologram;
440—(incident, injection, insertion) hologram
450—WG component;
450A, 450B—upper and lower surfaces of the component 450;
454, 464, 474—beams of light;
510—WG component;
510A, 510B—upper and lower surfaces of the component 510;
514—(incident, injection, insertion) hologram;
516, 536, 540—beams of light
520—object;
524—light guided by the component 510;
528—extraction hologram;
532—light outcoupled from the component 510 by the extraction hologram 528;
534—light outcoupled from the body of the component 510;
544—light propagating through the body of the component 510;
560—optical detector;
610—spatially-curved WG component
610A, 610B—upper and lower surfaces of the component 610;
614—light incident onto the component 610 from the object 616;
616—object 616;
620 (620')—not corrected injection hologram (corrected injection hologram);
640A, 640B, 640C, 640D—pupil sizes (foot-prints);
650—light distribution inside WG component 610;
704—spatially-curved WG component;
710—(incident, injection, insertion) hologram;
720—extraction hologram;
730—redirection hologram;
740—multiple ray-traces indicating propagation of light in the WG component 704;
800—layout of an embodiment;
804—spatially-curved WG component;
810—pupil size (foot print of light) at (incident, injection, insertion) hologram
820—extraction hologram;
822—pupil size (foot-print of light channeled by the WG component 810) at extraction hologram 820;
830—redirection hologram;
832—pupil size (foot-print of light channeled by the WG component 810) at redirection hologram 830.

The invention claimed is:

1. An optical waveguide system comprising:
a waveguide (WG) of optically-transparent material having upper and lower surfaces, at least one of the upper and lower surfaces being curved in at least one dimension; and
a first holographic layer disposed at a first location in contact with a first surface of the upper and lower surfaces;
wherein the first holographic layer is configured to couple a first light beam, incident thereon, into said WG to form a coupled optical wavefront and cause said coupled optical wavefront to propagate along a first extent of the WG from the first location to a second location, and
wherein the optical waveguide system is configured such that extent of a foot-print in the at least one dimension remains substantially constant upon propagation of the coupled optical wavefront along the first extent of the WG, said foot-print defined by an intersection of the coupled optical wavefront with any of the upper and lower surfaces.

2. The system according to claim 1, wherein said first light beam has a spatially-diverging optical wavefront.

3. The system according to claim 1, further comprising:
a second holographic layer at a second location in contact with a WG surface of the upper and lower surfaces;
wherein the second holographic layer is configured to extract the coupled optical wavefront, incident thereon, from the WG to form a spatially-converging second light beam.

4. The system according to claim 3, wherein the first surface and the WG surface are the same surface of the upper and lower surfaces.

5. The system according to claim 1,
wherein the at least one of the upper and lower surfaces is curved in a first dimension and in a second dimension, the first and second dimensions defined by first and second axes, respectively,
wherein the first and second axes are transverse to one another.

6. The system according to claim 1, further comprising:
a third holographic layer disposed at a third location in contact with a surface of the upper and lower surfaces;
wherein the third holographic layer is configured
a) to receive the coupled optical wavefront that has propagated in the WG from the first holographic layer, and
b) to redirect said coupled optical wavefront along a second extent of the WG.

7. The system according to claim 6, wherein the third location is separated from the first location by a first separation distance that is substantially equal to an integer multiple of said extent of the foot-print.

8. The system according to claim 3,
wherein the second holographic layer includes several portions;
wherein a first portion of the second holographic layer is characterized by a first diffraction efficiency with which light, incident onto said first portion of the second holographic layer, is diffracted by the second holographic layer;

wherein a second portion of the second holographic layer is characterized by a second diffraction efficiency with which light, incident onto said second portion of the second holographic layer, is diffracted by the second holographic layer; and wherein the first and second diffraction efficiencies are different from each other thereby expanding the extent of said foot-print in a first direction.

9. The system according to claim 8, further comprising:
a third holographic layer disposed at a third location in contact with a surface of the upper and lower surfaces;
wherein the third holographic layer includes several portions;
wherein a first portion of the third holographic layer is characterized by a third diffraction efficiency with which light, incident onto said first portion of the third holographic layer, is diffracted by the third holographic layer;
wherein a second portion of the second holographic layer is characterized by a fourth diffraction efficiency with which light, incident onto said second portion of the third holographic layer, is diffracted by the third holographic layer; and
wherein the third and fourth diffraction efficiencies are different from each other thereby causing expansion of the extent of said foot-print in a second direction.

10. The system according to claim 1, wherein at least one holographic layer juxtaposed with the WG is configured to change a degree of spatial spreading of light incident thereon.

11. A method for forming an image in light emanating from a source of light, the method comprising:
propagating first light, incident onto a first holographic layer attached to a surface of an optical waveguide (WG) at a first location of the WG, inside the WG to a second location,
wherein said first light propagating inside the WG has an optical wavefront; and
extracting light from the WG at the second location to form outcoupled light to generate the image at an image plane,
wherein the WG has upper and lower surfaces, at least one of the upper and lower surfaces being curved in at least one dimension;
wherein a combination of the first holographic layer and the WG is configured such that extent of a foot-print in the at least one dimension remains substantially constant upon propagation of the first light inside the WG along a first axis,
wherein said foot-print is defined by an intersection of the optical wavefront with any of the upper and lower surfaces.

12. The method according to claim 11,
wherein said extracting includes extracting light at the second location with the use of a second holographic layer disposed therein in contact with the WG,
wherein the second location is separated from the first location by a first separation distance that is substantially equal to an integer multiple of said extent of the foot-print.

13. The method according to claim 12, comprising:
redirecting the first light propagating inside the WG along the first axis to propagate inside the WG along a second axis, the first and second axes being transverse to one another.

14. The method according to claim 13, wherein the first axis represents a first extent of the WG and the second axis represents a second extent of the WG, and wherein said redirecting includes redirecting the first light upon interaction of said first light with a third holographic layer juxtaposed with a surface of the WG at a third location.

15. The method according claim 11,
wherein said propagating includes propagating the light inside the WG with the at least one of the upper and lower surfaces being curved in a first dimension and in a second dimension, the first and second dimensions being defined by a third axis and a fourth axis, respectively;
wherein the third and fourth axes are transverse to one another.

* * * * *